United States Patent [19]
McLeod, Jr.

[11] 3,776,600
[45] Dec. 4, 1973

[54] VALVE FOR VACUUM LOADER
[75] Inventor: John H. McLeod, Jr., Royal Oak, Mich.
[73] Assignee: Thoreson-McCosh, Inc., Troy, Mich.
[22] Filed: June 7, 1971
[21] Appl. No.: 150,610

[52] U.S. Cl. .................................................. 302/59
[51] Int. Cl. ............................................ B65g 53/60
[58] Field of Search ............... 137/535, 542, 543.17; 251/144, 86; 302/59, 62; 417/148; 222/449, 495–497

[56] References Cited
UNITED STATES PATENTS

| | | | |
|---|---|---|---|
| 3,213,879 | 10/1965 | Thompson | 251/86 X |
| 304,982 | 9/1884 | Wiesebrock | 302/59 X |
| 2,170,478 | 8/1939 | Long et al. | 137/542 X |
| 2,870,779 | 1/1959 | Thomiszer | 137/542 X |
| 1,115,194 | 10/1914 | Hay | 302/59 |
| 3,414,232 | 12/1968 | Hellman | 251/86 |
| 1,939,128 | 12/1933 | Meyer | 251/86 X |
| 3,014,485 | 12/1961 | Karlsson | 302/59 X |
| 1,772,881 | 8/1930 | Tolman | 302/59 |

Primary Examiner—Evon C. Blunk
Assistant Examiner—W. Scott Carson
Attorney—Reising, Ethington & Perry

[57] ABSTRACT

A granular or pulverant material loader in which a charging vessel has its discharge outlet controlled by a conical valve which closes and opens in response to application and release of vacuum within the vessel.

1 Claim, 4 Drawing Figures

VALVE FOR VACUUM LOADER

BACKGROUND OF THE INVENTION

This invention relates to valve means, and particularly to discharge or dump valves of the type used in the charging of hoppers with granular or pulverant material. In such apparatus the material is first drawn into a charging vessel from a storage bin by application of vacuum, the vessel and storage bin being interconnected by a conduit through which the vacuum draws the granular or pulverant material. When the vessel has become fully charged a valve is opened, allowing the material to discharge through its outlet into the hopper in which the material is to be stored preparatory to use thereof. Such loading arrangements are commonly used in the plastics industry, in which the granular or pulverant material is subsequently fed from the hopper into dies for molding various articles.

These dump or discharge valves should preferably operate automatically, that is, close when vacuum is applied to the loading vessel, and open when the vacuum is released. Although such automatic valves have been used in the past they have generally been either of the flexible sleeve type having one end which collapses to effect the closure, or in the form of a flat hinged plate which swings against a cooperating valve seat to effect the closure. Because such granular and pulverant material is somewhat abrasive, these prior valves have generally lacked durability. Also, and particularly in the case of the hinged plate valve, they tend to clog and become blocked against closing by discreet particles of the material. A conical valve, acts to distribute the material evenly by providing an annular flow path when open. Also, unlike the sleeve-type, it can be made of metal and thus avoids the problems of both wear and clogging experienced with such prior valves. Conical valves are, of course, broadly old in the art of controlling fluid flow, as seen for example in the U.S. Pat. Nos. 1,767,538 to Mahan, No. 3,170,478 to Long et al., and No. 2,870,779 to Thomiszer. I believe I am the first, however, to devise such a spring suspended conical valve for a granular material loader wherein direct actuation of the valve between its open and closed positions is effected by application and release of vacuum within the loading vessel.

It is accordingly the object of my invention to provide improved valve means for the discharge outlet of a vacuum type loader such as used in feeding granular or pulverant material to the hopper of a molding machine or the like. More specifically, the invention has as its object the provision of a resiliently suspended conical valve for the discharge outlet of such a flowable material loader wherein the vacuum used for drawing the material into the loader also acts directly on the valve to effect its closure, and when the vacuum is relieved the valve returns to its open position for discharge of the material through the outlet. Novel suspension means are provided for the valve including depending arms spaced laterally thereof and serving as mounts for springs connected to the valve. By making the valve hollow with its large end open the attachment of the spring is made internally of the valve cone. In one form of the invention leaf type springs are used which also serve importantly in centering the valve during its axial movement into and out of closing relation with the discharge outlet of the loader. In another form, the bracket supports a coil spring which extends into the valve and abuts the small end thereof. This form is adapted for guiding the movement of the valve by means of a post connected to the small end of the valve and extending therefrom through a bushed opening in the bracket, the coil spring being disposed around the post. Accommodation for angular alignment of the axis of the valve relative to the axis of the post may be provided by a ball and socket type connection between the upper end of the post and the valve.

The means by which these and other objects and advantages of the invention are obtained will be better understood from the following description, having reference to the drawings which show two specific embodiments thereof selected for purposes of illustration, wherein:

Figure 1:
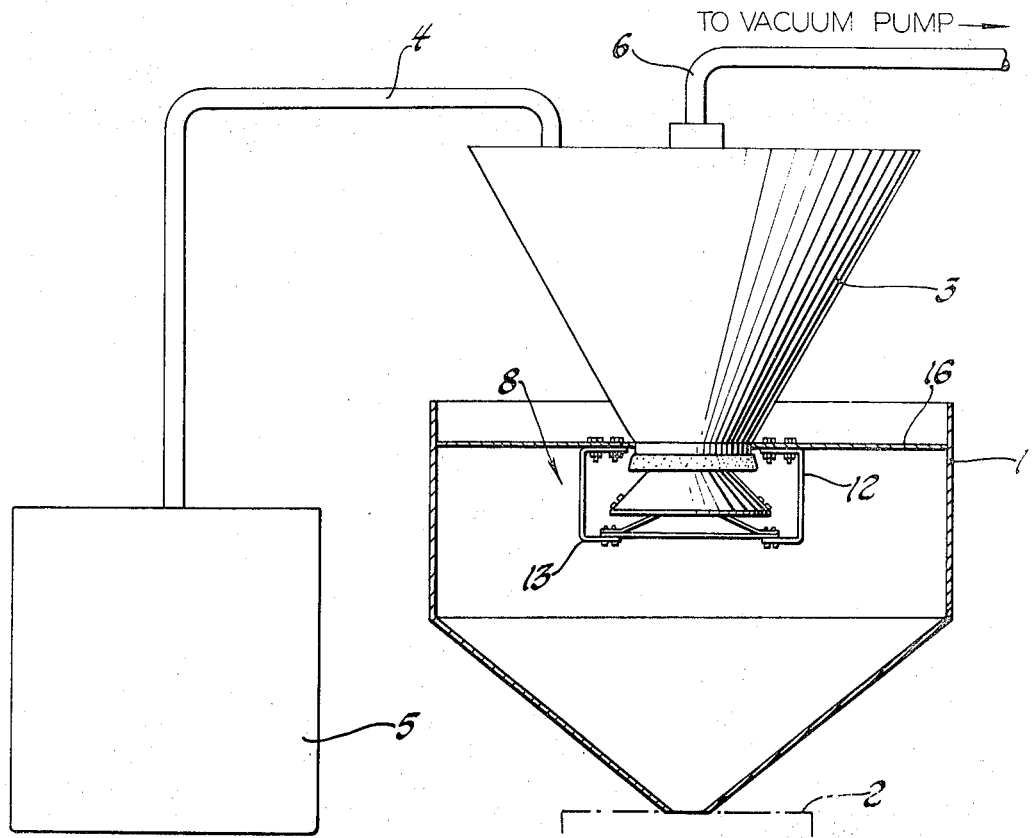
FIG. 1 is a side elevational view of a granular material loader having a discharge valve constructed in accordance with my invention.
Figure 2:
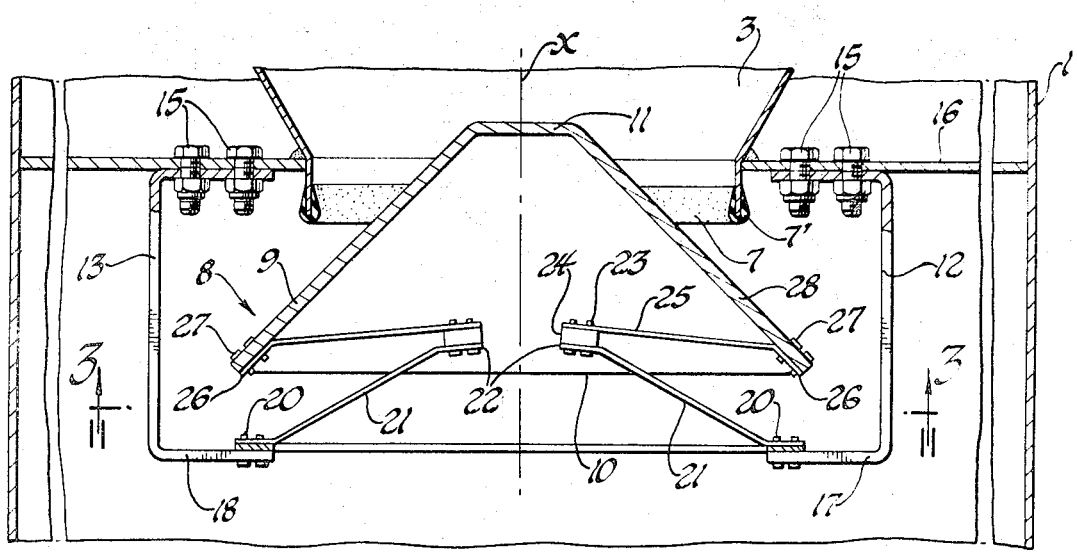
FIG. 2 is an enlarged fragmentary sectional view taken substantially along the line 2—2 of FIG. 3.

Referring now in detail to the drawings, and first to FIG. 1, a hopper 1 for feeding granular or pulverant material to a processor such as a molding machine or the like, indicated at 2, is periodically supplied with the material from a loading vessel 3 which is connected by a conduit 4 to a source of supply of the material, such as the storage bin 5. Both the loading vessel 3 and the storage bin 5 are closed chambers, and flow of the material into the vessel is induced by applying vacuum thereto by a suitable vacuum pump (not shown) connected thereto by the conduit 6 leading into the upper end of the vessel 3. This vessel preferably has inclined sidewalls which, as best shown in FIG. 2, terminate at the bottom in an annular discharge outlet 7. Suitable resilient gasket material 7' may be applied as coating around the outlet 7.

Figure 3:
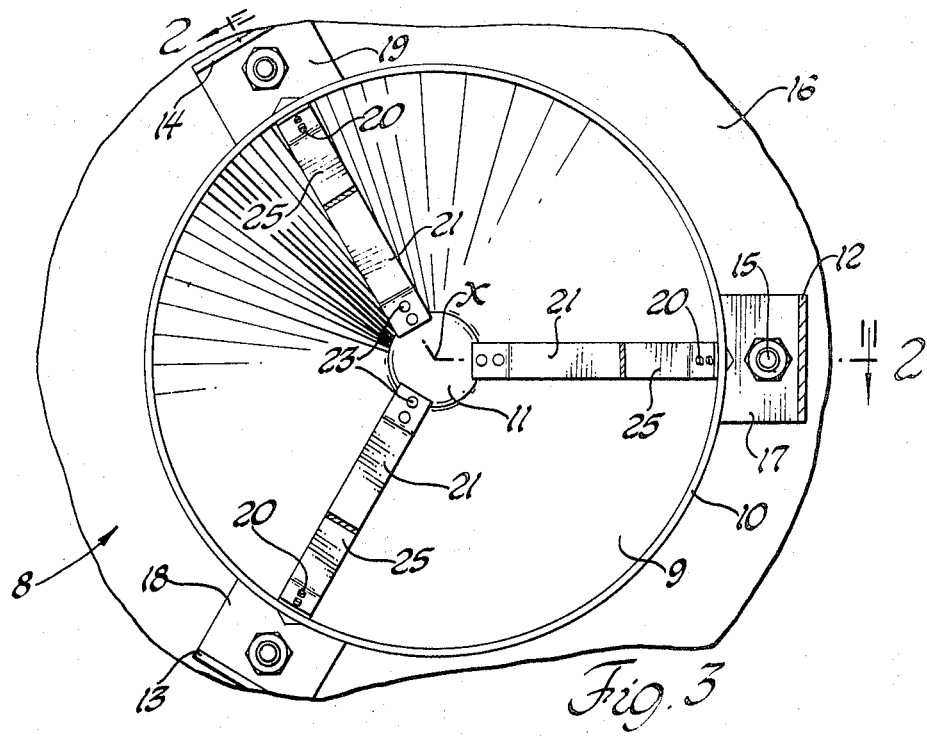
FIG. 3 is a partial sectional view taken substantially along the line 3—3 of FIG. 2.

Controlling the discharge outlet 7 is my improved valve means which is designated generally by the numeral 8. Included therein is a hollow frusto-conical valve element 9 having its lower large end 10 open and its smaller upper end 11 protruding into the vessel 3 through the outlet 7. Means for so suspending the valve element 9 are bracket means in the form of depending arms 12, 13 and 14 (FIG. 3) whose upper ends are suitably fixed as by bolting at 15 to a framelike member 16 interconnecting the upper portion of the hopper 1 and the lower portion of the vessel 3. These arms have their lower extremities 17, 18 and 19 in-turned radially toward the axis X of the outlet 7 and conical valve element 9. Secured as by riveting at 20 to each of the in-turned arm portions is a leaf spring 21 which also extends radially inward toward the axis X, and is somewhat inclined upwardly through the lower open end 10 of the valve element so that the inner and upper ends 22 of these leaf springs terminate within the hollow valve element. Each such leaf spring 21 is connected at its end 22, as by riveting 23 and a spacer block 24, to the one end of an upper leaf spring 25. Each leaf spring 25 extends radially outward from its connection with the leaf spring 21 and has its outer end 26 connected as by riveting 27 to the inner surface of the valve element adjacent its lower outer end 10. The leaf springs thus serve to resiliently suspend the valve element for axial movement into and out of closing engagement with the outlet 7, and, as shown in FIG. 3, these springs and their supporting bracket arms 12, 13 and 14 are equally spaced circumferentially about the valve so that it is properly centered both to insure full seating when in closed position and uniform spacing of its conical external surface 28 within the outlet 7 when in open position.

The open position of the valve shown in FIG. 2 is that which occurs when the vacuum has been relieved from the interior of the vessel 3 conduit 4 and loading bin 5, permitting all such material previously contained in the vessel to be discharged through the outlet 7 into the hopper 1. In such position, the springs 21, 25 support the valve element 9 so that its external conical surface 28 is radially spaced from the outlet 9, and,upon reapplication of the vacuum to reload the vessel 3 with granular material from the bin 5, this vacuum also draws the valve upwardly into seating engagement with the outlet 7. Thence, after the vessel has been reloaded with the material from the bin 5, and the vacuum is again cut off, the springs return the valve element downwardly in response to the release of the vacuum, aided by the pressure of the granular material in the vessel 3 acting against the valve elements' external surface 28. The conical shape of the external surface 28 of the valve, together with the centering action of the springs 21, 25, serve in the valve open position to evenly distribute the flow of material out of the vessel through its discharge outlet 7. Because of the valve's conical shape and the relatively large annular area between it and the outlet 7 which is provided in the valve open position, rapid dumping of the vessel 3 is obtained, and any tendency of the material to clog between the conical surface 28 and the outlet 7 is avoided. Also, during closing of he valve, no opportunity exists for individual pellets of the material becoming lodged between the valve and the outlet to block closing of the valve. It will be appreciated that the springs 21, 25 are selected to have sufficient stiffness to support the weight of the valve element 9 in its open position, and a deflection rate accommodating the raising of the valve to its closed position in response to application of vacuum within the vessel 3.

Figure 4:
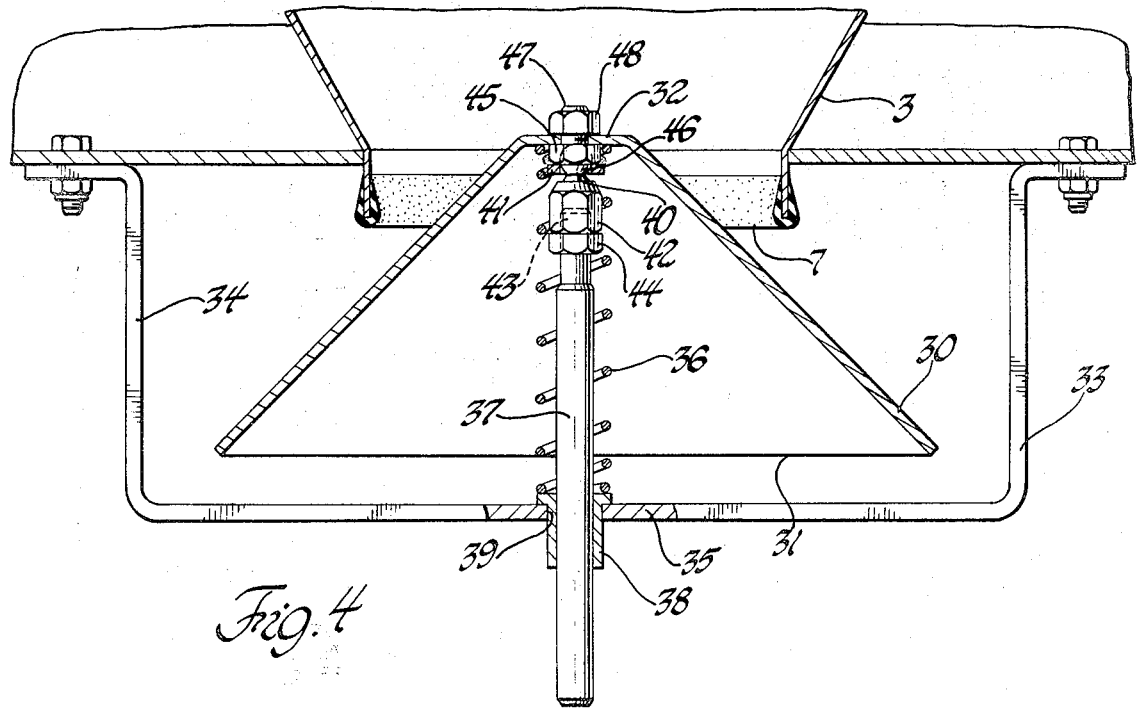
FIG. 4 is a side elevational view of a modified form of the invention, certain parts being shown broken away and in section.

Referring to FIG. 4, a modified form of the invention is shown. A similar frusto-conical valve element 30 is employed, having its lower large end 31 open and its smaller upper end 32 protruding into the vessel 3 through the outlet 7 as in the preceding embodiment. The suspension means differs, however, in that it comprises two depending arms 33 and 34 spacedly embracing the valve element 30 and having their lower ends interconnected by a yoke portion 35 which supports a coil spring 36 extending upwardly into abutment with the small end 32 of the valve element. This coil spring 36 acts similarly to the leaf springs 21, 25 of the previously described embodiment in suspending the valve element in its normally open position shown, and having a deflection rate accommodating axial movement of the valve element into closing engagement with the vessel outlet 7 in response to application of vacuum within the loading vessel 3. If desired, the upper and lower ends of the coil spring 36 may be suitably anchored to the upper end 32 of the valve element and yoke 35, respectively, so that the coil spring itself serves to properly center the valve relative to the vessel outlet 7. However, in the preferred arrangement as shown, guiding means for the valve element is provided in the form of a post 37 which is slidably received in a bushing 38 fixed in an opening 39 in the yoke, and having a connection at the upper end of the post to the small end 32 of the conical valve element. The post 37, as shown, extends through the coil spring 36 and thus guides opening and closing movements of the valve coaxially with the vessel outlet 7. In order to accommodate a certain amount of angular misalignment or tilting of the valve element about the upper end of the post, a ball and socket type connection is used therebetween. As shown, this comprises a ball like member 40 suitably secured, as by threading its lower portion 42 onto the screw threaded upper end 43 of the post and clamping it with a jam nut 44. Pivotally embracing the part-spherical upper end 41 of the member 40 is a socket member 45 having a part-spherical internal surface 46. The socket member 45 has an upwardly extending stud portion 47 extending through an aperture in the upper end 32 of the valve element and secured thereto by a nut 48.

It will be appreciated that the valve element and its suspending means shown in FIG. 4 operates in a similar manner to that of the first embodiment described with reference to FIGS. 1–3. Thus, the valve element 30 is drawn into closing engagement with the outlet 7 of the loading vessel 3 upon application of the vacuum to the latter, and after the vessel has become filled with granular material and the vacuum is cut off, the valve element automatically moves downwardly to its open position, allowing the material to flow outwardly of the vessel in a uniformly distributed annular path around the conical surface of the valve element 30.

Although my invention has been above described and illustrated in respect to only two preferred embodiments, it will be appreciated that various minor changes in the design of the various parts and their interrelationship may be made without departing from the spirit and scope of the invention as hereinafter claimed.

Having thus described my invention, I claim:

1. In combination with a closed vessel into which a charge of granular or pulverant material is first introduced by application of vacuum within the vessel and then discharged therefrom upon release of the vacuum, said vessel having an annular outlet for discharge of said material, a valve having a conical face movable into and out of closing relation with said outlet, and means suspending said valve in an open position wherein the conical face thereof protrudes into the vessel but is spaced therefrom in the plane of the outlet, said suspending means including spring means suspending the valve from said vessel, said spring means being yieldable to accommodate movement of the valve to a fully closed position wherein said conical face has abutting engagement with the vessel in the plane of said outlet in response to application of vacuum within the vessel, said suspending means also including rigid bracket means connected to the vessel, said spring means comprising leaf springs extending radially toward the axis of the valve, the radially inner ends of said springs being connected together and the outer ends of said springs being connected to said bracket means and to the valve respectively.

* * * * *